US012567266B2

(12) United States Patent
Wen et al.

(10) Patent No.: US 12,567,266 B2
(45) Date of Patent: Mar. 3, 2026

(54) IMAGE RECOGNITION SYSTEM AND IMAGE RECOGNITION METHOD DETECTING DRIVABLE AREAS IN UNPAVED OR UNIMPROVED ROADS

(71) Applicant: VIA Technologies, Inc., Taipei (TW)

(72) Inventors: Cheng Yu Wen, Taipei (TW);
Yao-Ching Peng, Taipei (TW)

(73) Assignee: VIA TECHNOLOGIES, INC., Taipei City (TW)

( * ) Notice: Subject to any disclaimer, the term of this patent is extended or adjusted under 35 U.S.C. 154(b) by 273 days.

(21) Appl. No.: 18/522,372

(22) Filed: Nov. 29, 2023

(65) Prior Publication Data
US 2025/0061727 A1      Feb. 20, 2025

(51) Int. Cl.
*G06V 20/56* (2022.01)
*G06V 10/764* (2022.01)
*G06V 10/82* (2022.01)
*G06V 20/58* (2022.01)

(52) U.S. Cl.
CPC .......... *G06V 20/588* (2022.01); *G06V 10/764* (2022.01); *G06V 10/82* (2022.01); *G06V 20/58* (2022.01); *B60W 2420/403* (2013.01)

(58) Field of Classification Search
CPC .... G06V 20/588; G06V 10/764; G06V 10/82; G06V 20/58; B60W 2420/403
See application file for complete search history.

(56) References Cited

U.S. PATENT DOCUMENTS

2023/0072637 A1*  3/2023  Xia ...................... G06N 3/0455

FOREIGN PATENT DOCUMENTS

CN      110738081 A  *  1/2020  ............... G06T 7/62
CN      116129383 A  *  5/2023  ........... G06V 20/588

* cited by examiner

*Primary Examiner* — Emily C Terrell
*Assistant Examiner* — Daniella M. DiGuglielmo
(74) *Attorney, Agent, or Firm* — McClure, Qualey & Rodack, LLP

(57) ABSTRACT

The image recognition system includes an image sensor and an image processor. The image sensor acquires a plurality of sensed images of continuous frames. The image processor performs image recognition on the plurality of sensed images. The image processor determines on the plurality of sensed images respectively whether the sensed image is a valid frame not containing a road, to determine a plurality of valid sensed images. The image processor determines from the plurality of valid sensed images respectively whether a proportion of an area of a drivable area in a plurality of sub-image regions of the valid sensed image is less than a preset proportion, to perform danger marking. The image processor calculates the number of danger marks of the sub-image regions for each of the valid sensed images. When the number of danger marks is greater than a preset threshold, the image processor generates a danger warning.

20 Claims, 5 Drawing Sheets

IMAGE RECOGNITION SYSTEM AND IMAGE RECOGNITION METHOD DETECTING DRIVABLE AREAS IN UNPAVED OR UNIMPROVED ROADS

CROSS-REFERENCE TO RELATED APPLICATIONS

This application claims the priority benefit of Taiwan application serial no. 112130565, filed on Aug. 15, 2023. The entirety of the above-mentioned patent applications are hereby incorporated by reference herein and made a part of this specification.

TECHNICAL FIELD

The present disclosure relates to an image analysis technology, in particular to an image recognition system and an image recognition method.

BACKGROUND

A general image recognition system for vehicle can be used for driving assistance functions such as determinations of lane lines and lane shifts. However, the above functions may not work when the vehicle is driving in an environment of unpaved or unimproved roads. In other words, a general image recognition system for vehicle will not be able to provide effective driving assistance functions in an environment of unpaved or unimproved roads.

SUMMARY

The present disclosure provides an image recognition system and an image recognition method, which can effectively recognize a drivable area in a sensed image and issue a danger warning. An image sensor is configured to acquire a plurality of sensed images of continuous frames. An image processor is electrically coupled to the image sensor, and is configured to perform image recognition on the plurality of sensed images. The image processor determines on the plurality of sensed images respectively whether the sensed image is a valid frame not containing a road, to determine a plurality of valid sensed images; and the image processor determines on the plurality of valid sensed images respectively whether a proportion of an area of a drivable area in a plurality of sub-image regions of the valid sensed image is less than a preset proportion, to perform danger marking. The image processor calculates the number of danger marks of the plurality of sub-image regions for each of the plurality of valid sensed images. When the number of danger marks corresponding to a same sub-image region is greater than a preset threshold, the image processor generates a danger warning.

The image recognition method according to the present disclosure comprises: acquiring a plurality of sensed images of continuous frames by an image sensor; determining on the plurality of sensed images respectively, by an image processor, whether the sensed image is a valid frame not containing a road, to determine a plurality of valid sensed images; determining on the plurality of valid sensed images respectively, by the image processor, whether a proportion of an area of a drivable area in a plurality of sub-image regions of the valid sensed image is less than a preset proportion, to perform danger marking; calculating, by the image processor, the number of danger marks of the plurality of sub-image regions for each of the plurality of valid sensed images; and when the number of danger marks corresponding to a same sub-image region is greater than a preset threshold, generating a danger warning by the image processor.

Based on the foregoing, the image recognition system and the image recognition method according to the present disclosure can effectively recognize a drivable area in the sensed image, and the image processor can automatically generate a danger warning in a case that the proportion of the drivable area in the sensed image is less than a preset proportion.

In order to make the above features and advantages of the present disclosure more obvious and understandable, the following embodiments are described in detail with reference to the drawings.

Figure 1:
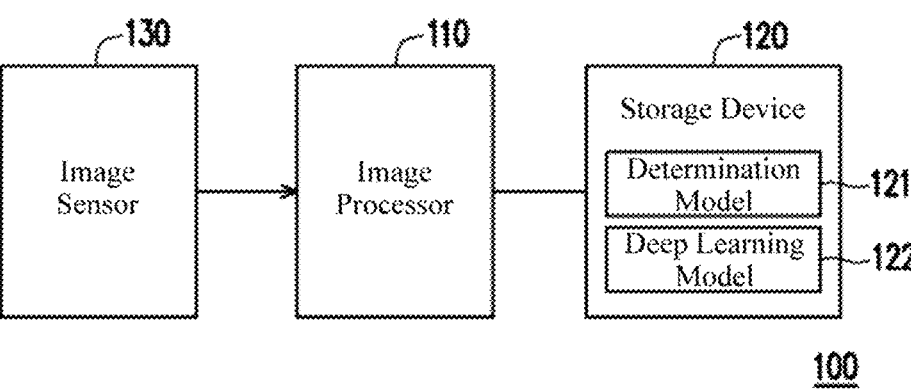
FIG. 1 is a schematic diagram of an image recognition system according to an embodiment of the present disclosure.

A brief of the numerical references in the drawings is given below.

100: image recognition system; 110: image processor; 120: storage device; 121: determination model; 122: deep learning model; 130: image sensor; 301_1~301_M: sensed images; 302_1~302_N: valid sensed images; 302_0'~302_(N+1)': segmented valid sensed images; 302_1A~302_NA, 302_1B~302_NB, 302_1C~302_NC: sub-image regions; 700: display screen; 701: corresponding area; 800, 900: labelled reference images; 801, 901, R1: drivable area; 802, 803, 902, 903, R2: undrivable area; 804, 805, 904, 905, 906: obstacle area; 806, 807, 907, 908, 909, R3: background area; 910, 911 and 912: unlabeled area; S210~S250: steps.

DETAILED DESCRIPTION

In order to make the present disclosure easier to understand, the following specific embodiments are given as examples according to which the present disclosure can be implemented. In addition, wherever possible, elements/components/steps with the same numerical references in the drawings and the embodiments denote the same or similar parts.

FIG. 1 is a schematic diagram of an image recognition system according to an embodiment of the present disclosure. Referring to FIG. 1, an image recognition system 100 includes an image processor 110, a storage device 120, and an image sensor 130. The image processor 110 is electrically coupled to the storage device 120 and the image sensor 130. The storage device 120 may store a determination model 121 and a deep learning model 122. In an embodiment, the image recognition system 100 may only include the image processor 110 and the storage device 120, while externally connected to the image sensor 130.

In this embodiment, the image recognition system 100 may be, for example, an driver assistance image recognition system for vehicle, for the driver's acquisition of a travelling image in front of the vehicle on a display in the vehicle, and may automatically execute a real-time image recognition function. The image recognition system 100 may be configured to automatically detect a drivable section in the wilderness or of an unpaved or unimproved road (for example, a drivable area which is not an undrivable area such as a hill, a rock face or a deep valley or a background area) as well as obstacles, so as to effectively alert the vehicle driver. In addition, the image recognition system 100 may further have other image recognition functions, such as general detections of lane lines or lane shifts.

In this embodiment, the image sensor 130 may acquire sensed images and provide the sensed images to the image processor 110. The image processor 110 may read the sensed images and execute the determination model 121 and the deep learning model 122 to process the sensed images, to recognize a drivable area in the sensed image, and may further determine whether to output a danger warning based on a size of the drivable area in the sensed image.

In this embodiment, the image processor 110 may include, for example, a Central Processing Unit (CPU), a Graphics Processing Unit (GPU) or other programmable general-purpose or dedicated microprocessors, a Digital Signal Processor (DSP), a Programmable Controller, an Application Specific Integrated Circuit (ASIC), a Programmable Logic Device (PLD), other similar processing devices, or a combination of these devices.

In this embodiment, the storage device 120 may be, for example, a Dynamic Random Access Memory (DRAM), a Flash memory or a Non-Volatile Random Access Memory (NVRAM). The storage device 120 may store algorithms and programs related to the determination model 121 and the deep learning model 122, and may also store or temporarily store sensed images, data generated during image processing, and the likes. In an embodiment, the determination model 121 and the deep learning model 122 may be implemented by the same algorithm or program.

In this embodiment, the image sensor 130 may include, for example, a Charge coupled device (CCD) or a CMOS image sensor (CIS), and may be implemented with an architecture such as a fisheye lens or a general lens. In this embodiment, the image sensor 130 may acquire a plurality of sensed images continuously in real time, and provide them to the image processor 110 for image recognition.

Figure 2:
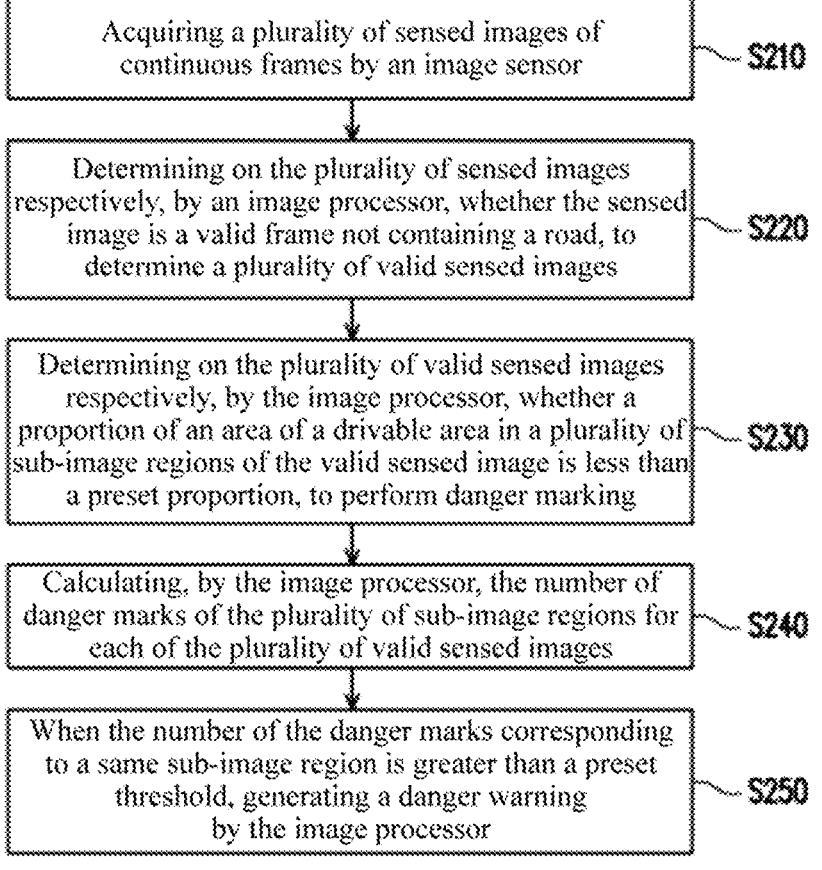
FIG. 2 is a flowchart of an image recognition method according to an embodiment of the present disclosure.

FIG. 2 is a flowchart of an image recognition method according to an embodiment of the present disclosure. Referring to FIG. 1 and FIG. 2, the image recognition system 100 may perform the following steps S210 to S250. In step S210, the image sensor 130 may acquire a plurality of sensed images of continuous frames. The image sensor 130 may output a plurality of sensed images to the image processor 110. In step S220, the image processor 110 may determine on the plurality of sensed images respectively whether the image is a valid frame not containing a road, to determine a plurality of valid sensed images. In this embodiment, the image processor 110 may input a plurality of sensed images into the determination model 121, such that the determination model 121 determines whether the plurality of sensed images are valid frames that do not contain a road, to determine a plurality of valid sensed images. Moreover, when the image processor 110 determines that at least one of the sensed images 301_1 to 301_M is a valid frame containing a road, the image processor 110 will not perform a determination of a proportion of an area of a drivable area or a calculation of the number of danger marks on the sensed image of the valid frame containing a road. In this embodiment, the image processor 110 may sequentially access and analyze a plurality of valid sensed images through a queue.

In step S230, the image processor 110 may determine on the plurality of valid sensed images respectively whether a proportion of the area of the drivable area in a plurality of sub-image regions of the valid sensed image is less than a preset proportion, so as to perform danger marking. In this embodiment, the image processor 110 may input a plurality of valid sensed images into the deep learning model 122, such that the deep learning model 122 may respectively classify and label a plurality of sub-image regions for a plurality of valid sensed images, so as to determine a proportion of an area of a drivable area in the plurality of sub-image regions respectively.

In step S240, the image processor 110 may calculate the number of danger marks of the plurality of sub-image regions for each of the plurality of valid sensed images. In step S250, when the number of danger marks corresponding to a same sub-image region is greater than a preset threshold, the image processor 110 may generate a danger warning. Therefore, the image recognition system 100 and the image recognition method according to this embodiment may perform automatic recognitions on the sensed images and issue a danger warning instantly. The execution details of each step will be illustrated respectively by each of the following embodiments.

Figure 3:
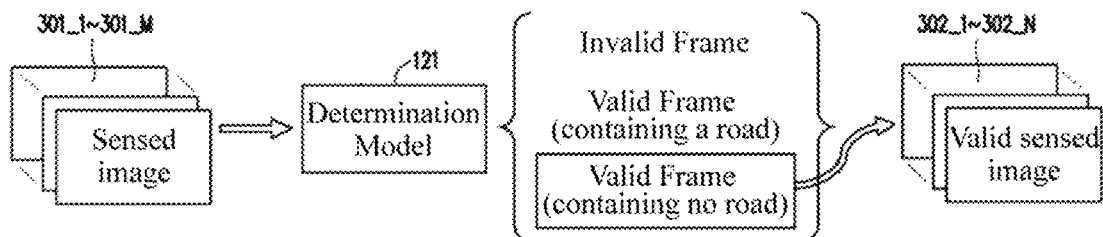
FIG. 3 is a schematic diagram of a procedure of a pre-processing of image according to an embodiment of the present disclosure.

FIG. 3 is a schematic diagram of a pre-processing of image according to an embodiment of the present disclosure. Referring to FIG. 1 and FIG. 3, with respect to the above step S220, the image processor 110 may execute the determination model 121 for pre-processing of image, wherein the determination model 121 may also be a trained deep learning model or a trained neural network (NN) model, but the present disclosure is not limited thereto. In this embodiment, the image processor 110 may input the plurality of sensed images 301_1 to 301_M into the determination model 121 such that the determination model 121 may determine whether the sensed images 301_1 to 301_M are valid frames that do not contain a road, to determine valid sensed images 302_1 to 302_N, wherein M and N are positive integers and N is less than or equal to M. The valid sensed images 302_1 to 302_N may be, for example, images of unpaved or unimproved roads which satisfy preset image quality conditions. For this, the plurality of sensed images 301_1 to 301_M may be inputted by the image processor 110 into the determination model 121 and be classified by the determination model 121.

Specifically, in this embodiment, the determination model 121 may sequentially determine each of the sensed images 301_1 to 301_M as an invalid frame, a valid frame that contains a road, or a valid frame that does not contain a road. The invalid frame may, for example, refer to a sensed image that is overexposed, a sensed image that is unclear due to lens stains, or a sensed image with excessive noise. If the image processor 110 acquires a valid frame containing a road, it indicates that the current driving environment is on a normal lane, and thus the corresponding sensed image may be used, for example, for detecting lane line shifts, without any subsequent drivable area detection. If the image processor 110 acquires a valid frame that does not contain a road, it indicates that the current driving environment is on an unpaved or unimproved road (e.g., in the wilderness or on a road that does not have clear or recognizable lane lines), thus the corresponding sensed image may be used for the subsequent drivable area detection. In addition, according to an embodiment, the determination on whether the valid sensed images 302_1 to 302_N satisfy the preset image quality conditions may be realized by, for example, the image processor 110 first determining whether the image sharpness is greater than a preset value.

Figure 4:
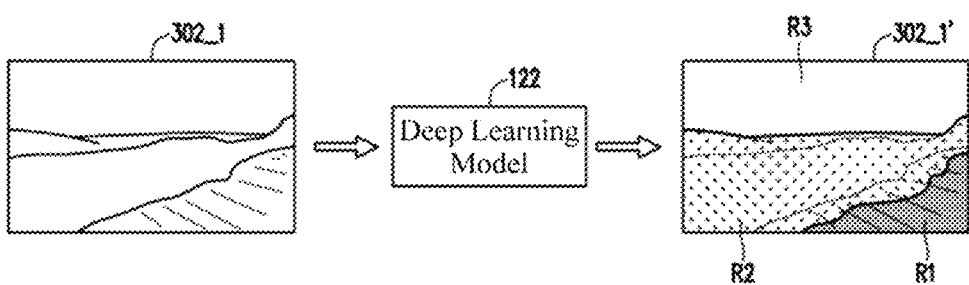
FIG. 4 is a schematic diagram of a procedure of a post-processing of image according to an embodiment of the present disclosure.
Figure 5:
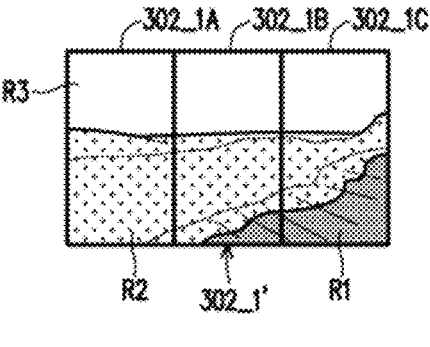
FIG. 5 is a schematic diagram of a plurality of sub-image regions according to an embodiment of the present disclosure.
Figure 6:
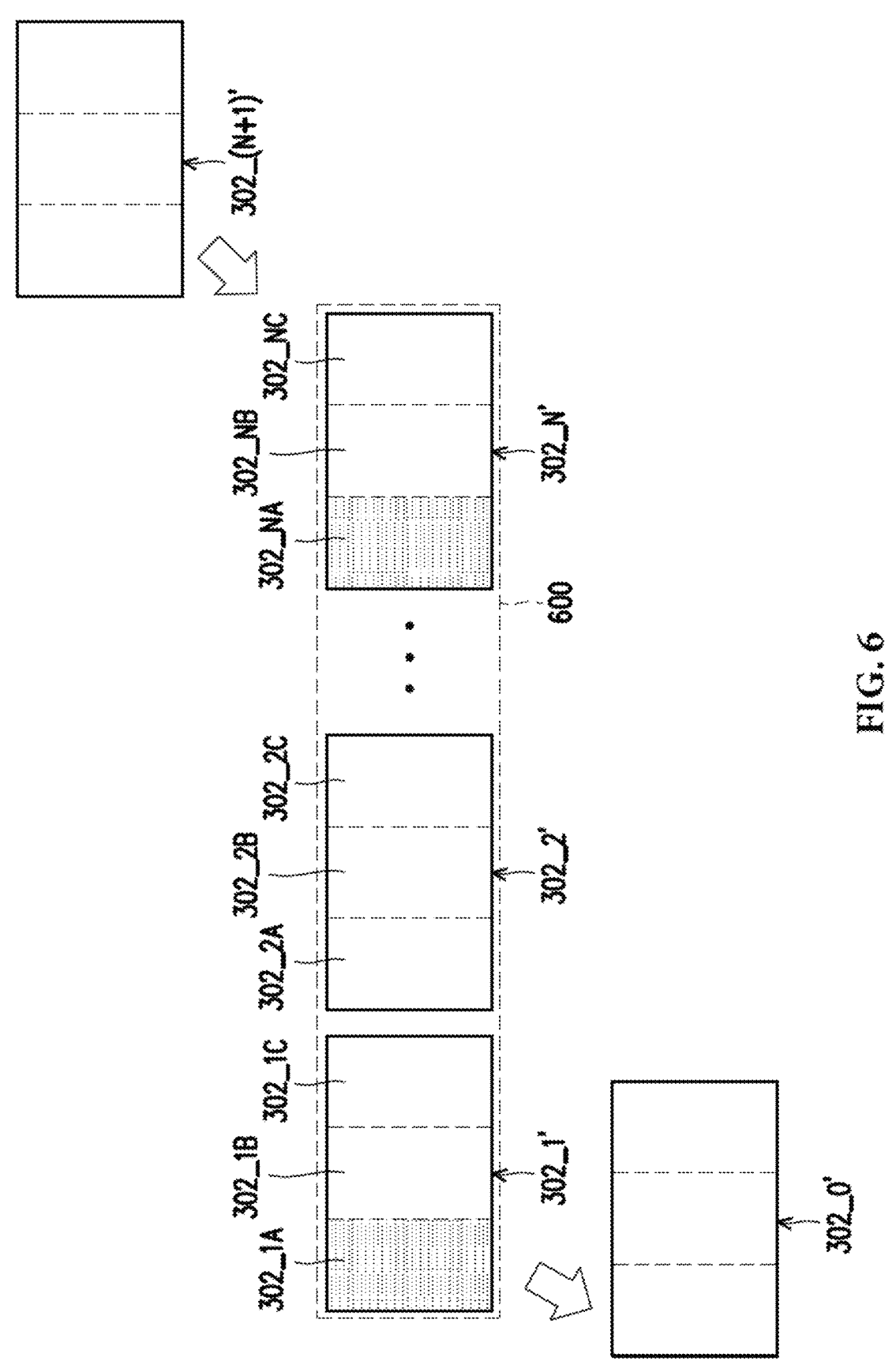
FIG. 6 is a schematic diagram of a queue for sequentially accessing a plurality of valid sensed images according to an embodiment of the present disclosure.
Figure 7:
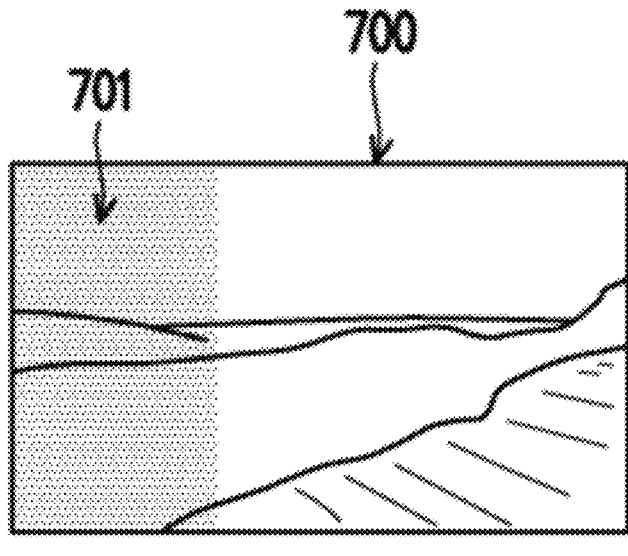
FIG. 7 is a schematic diagram of a danger warning according to an embodiment of the present disclosure.

FIG. 4 is a schematic diagram of a procedure of post-processing of image according to an embodiment of the present disclosure. FIG. 5 is a schematic diagram of a plurality of sub-image regions according to an embodiment of the present disclosure. FIG. 6 is a schematic diagram of a queue for sequentially accessing a plurality of valid sensed images according to an embodiment of the present disclosure. FIG. 7 is a schematic diagram of a danger warning according to an embodiment of the present disclosure. Referring to FIG. 1 and FIG. 4 to FIG. 7, regarding the above step S230, the image processor 110 may execute the deep learning model 122 for post-processing of image. In this embodiment, the image processor 110 may input each of the valid sensed images 302_1 to 302_N (RGB images) in FIG. 3 into the deep learning model 122. In this embodiment, the deep learning model 122 may be implemented, for example, with a BiSeNetv2 segmentation model, but the present disclosure is not limited thereto.

Taking the valid sensed image 302_1 as an example, as shown in FIG. 4, the valid sensed image 302_1 may be an image of the current environment in front of the vehicle acquired by the image sensor 130, wherein the image includes, for example, the sky, a mound of earth, and a road. The image processor 110 may input the valid sensed image 302_1 into the deep learning model 122, and the deep learning model 122 may output segmented valid sensed image 302_1' (i.e., for example, outputting a segmentation map of a plurality of areas corresponding to different labels by image segmentation). Thus, the deep learning model 122 may label at least one of a drivable area, an undrivable area, a background area, or an obstacle area (i.e., having at least one segmented area) in the valid sensed image. As shown in FIG. 4, the segmented valid sensed image 302_1' includes a plurality of drivable areas R1, undrivable areas R2, and background areas R3 that may be labelled.

Next, as shown in FIG. 5, the image processor 110 may further divide the segmented valid sensed image 302_1' into a plurality of sub-image regions. As shown in FIG. 5, the segmented valid sensed image 302_1' may be divided into sub-image regions 302_1A, 302_1B, 302_1C (e.g., corresponding to the left front, the front, and the right front in the travelling direction of the vehicle) along a horizontal direction, but the present disclosure is not limited thereto. According to an embodiment, the segmented valid sensed image 302_1' may be divided into a plurality of sub-image regions in different forms and in different numbers. Or, according to another embodiment, the segmented valid sensed image 302_1' may not be further divided into a plurality of sub-image regions. In this embodiment, the image processor 110 may determine the proportion of the area of the drivable area in the sub-image regions 302_1A, 302_1B, 302_1C of the segmented valid sensed image 302_1' respectively. By way of example, the proportion of the drivable area in the sub-image region 302_1A may be, for example, 0%, the proportion of the drivable area in the sub-image region 302_1B may be, for example, 8%, the proportion of the drivable area in the sub-image region 302_1C may be, for example 22%, and a preset proportion may be, for example, 5%. Accordingly, the image processor 110 may determine that the proportion of 0% in the sub-image region 302_1A is less than the preset proportion of 5%, thus perform a danger marking on the sub-image region 302_1A. The image processor 110 may determine that the proportion of 8% in the sub-image region 302_1B is greater than the preset proportion of 5%, thus no danger marking is performed on the sub-image region 302_1B; and the image processor 110 may determine that the proportion of 22% in the sub-image region 302_1C is greater than the preset proportion of 5%, thus no danger marking is performed on the sub-image region 302_1C.

After the danger marking, as shown in FIG. 6, the image processor 110 may input each of the valid sensed images 302_1 to 302_N in FIG. 3 into the deep learning model 122, such that the deep learning model 122 outputs segmented valid sensed images 302_1' to 302_N', and each of the segmented valid sensed images 302_1' to 302_N' may be divided into a plurality of sub-image regions. As shown in FIG. 6, the segmented valid sensed image 302_1' is divided into sub-image regions 302_1A, 302_1B, and 302_1C. The segmented valid sensed image 302_2' is divided into sub-image regions 302_2A, 302_2B, and 302_2C. The segmented valid sensed image 302_N' is divided into sub-image regions 302_NA, 302_NB, and 302_NC. In this embodiment, the image processor 110 may sequentially access these segmented valid sensed images 302_1' to 302_N' in a queue 600. Moreover, the image processor 110 may calculate the number of a plurality of danger marks of the sub-image regions 302_1A to 302_NA, 302_1B to 302_NB, and 302_1C to 302_NC of the segmented valid sensed images 302_1' to 302_N' respectively.

For example, as shown in FIG. 6, the image processor 110 may sequentially access and analyze the segmented valid sensed images 302_1' to 302_N' in the queue 600. The segmented valid sensed image 302_0' may be, for example, an image of a first frame in a previous image recognition operation in the queue 600 (with the older frames discarded) and the valid sensed image 302_(N+1)' may be, for example, an image of a last frame in a next image recognition operation in the queue 600 (i.e. the latest received frame). In this embodiment, the sub-image region 302_1A of the segmented valid sensed image 302_1' has a danger mark, and the sub-image region 302_NA of the segmented valid sensed image 302_N' has a danger mark. The sub-image region 302_2A of the segmented valid sensed image 302_2' has no danger mark. The image processor 110 may calculate the number of the danger marks of the sub-image regions 302_1A to 302_NA in the valid sensed images 302_1' to 302_N' which correspond to the same sub-image region. Assuming that a preset threshold is 5 and the number of the danger marks calculated by the image processor 110 is 7, it is indicated that the number of the danger marks corresponding to the same sub-image region is greater than the preset threshold. Thus, the image processor 110 may display a danger warning in a corresponding area of a display screen generated from the sensed images. In other words, since the image processor 110 may determine whether or not to generate a danger warning for at least one sub-image region based on a statistic result of the danger marks of the plurality of sub-image regions 302_1A~302_NA, 302_1B~302_NB and 302_1C~302_NC of the plurality of valid sensed images

302_1' to 302_N' in the queue 600, the image processor 110 may effectively avoid erroneous issue of the danger warning due to a misjudge.

As shown in FIG. 7, the image recognition system 100 may output, based on the sensed images 301_1 to 301_M in FIG. 3, corresponding display screen data to an external display (e.g., an in-vehicle display device), such that the external display may display a display screen 700. Moreover, as mentioned above, since the number of the danger marks of the sub-image regions 302_1A to 302_NA in the valid sensed images 302_1' to 302_N' which correspond to the same sub-image region is greater than the preset threshold, the image processor 110 may display a danger warning in a corresponding area 701 of the display screen 700, for example, by increasing red pixel values of the part of the screen corresponding to area 701, so as to effectively alert the driver that the chance of this area being a drivable area is excessively low. From another point of view, an excessively low proportion of the drivable area may be caused by a situation where the proportion of the undrivable area is excessively high, there is no drivable area at all, or the vehicle is too close to an obstacle; the present disclosure is not limited thereto.

Figure 8:
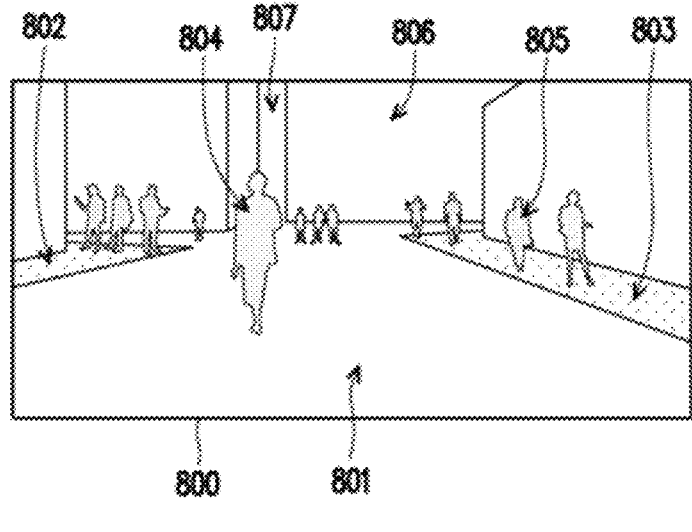
FIG. 8 is a schematic diagram of an original reference image according to an embodiment of the present disclosure.
Figure 9:
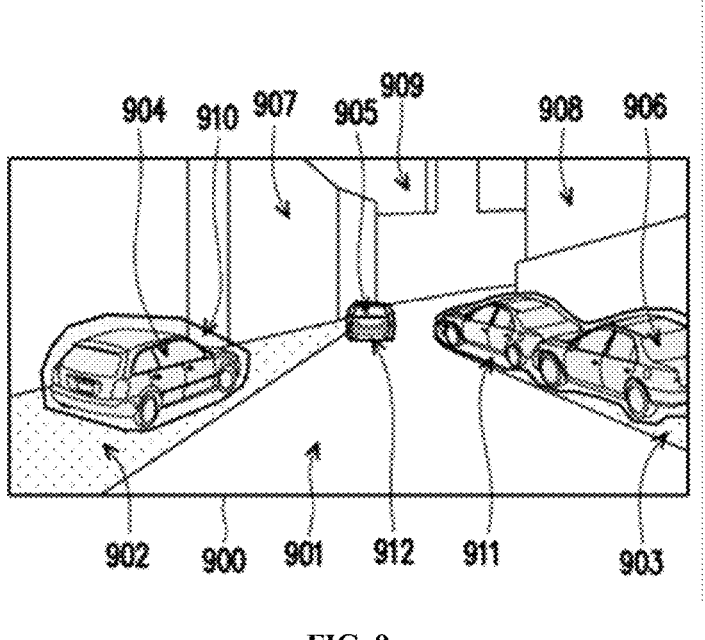
FIG. 9 is a schematic diagram of a labelled reference image according to an embodiment of the present disclosure.

FIG. 8 is a schematic diagram of an original reference image according to an embodiment of the present disclosure. FIG. 9 is a schematic diagram of a labelled reference image according to an embodiment of the present disclosure. Referring to FIG. 1, FIG. 8, and FIG. 9, in this embodiment, the deep learning model 122 may be pre-trained with a plurality of training data, wherein the plurality of training data respectively includes an original reference image and a labelled reference image. A labelled reference image may be acquired, for example, by a user labelling objects on an original reference image, and a labelled reference image may involve a label of at least one of a drivable area, an undrivable area, a background area, or an obstacle area. Taking FIG. 8 as an example, a labelled reference image 800 may be acquired, for example, by a user labelling objects on an original reference image, such as labelling a drivable area 801, undrivable areas 802, 803, obstacle areas 804, 805, and background areas 806, 807. Thus, the original reference image may be input into the deep learning model 122 such that the deep learning model 122 outputs a corresponding segmented image. The segmented image may be compared with the labelled reference image 800 for a comparison result, and the deep learning model 122 may make corrections based on the comparison result. Therefore, the trained deep learning model 122 may effectively label at least one of a drivable area, an undrivable area, a background area, or an obstacle area on the input sensed image.

In an embodiment, a labelled reference image may also involve at least one of a labelled drivable area, a labelled undrivable area, a labelled background area, a labelled obstacle area, or an unlabeled area. Taking FIG. 9 as an example, a labelled reference image 900 may be acquired, for example, by a user labelling objects on an original reference image (i.e., performing coarse annotations on the five categories of areas including the unlabeled areas), such as labelling a drivable area 901, undrivable areas 902, 903, obstacle areas 904, 905, 906, background areas 907, 908, 909, and unlabeled areas 910, 911, 912. For this, the unlabeled areas 910, 911, 912 may refer to boundary areas between objects (a boundary between objects in an image may be a portion that is blurred and is less easy to determine). As shown in FIG. 9, the unlabeled areas 910, 911, 912 may be boundaries between the obstacle areas 904, 905, 906 and the undrivable areas 902, 903 and that between the obstacle areas 904, 905, 906 and the background areas 907, 908, 909. Thus, since the image processing range for each frame of image may be reduced, the amount of computing in the training of the deep learning model 122 by the image recognition system may be effectively reduced, and/or the computing resources consumed by the deep learning model 122 in the image recognition process may be reduced (since the recognition range is reduced).

To sum up, the image recognition system and the image recognition method according to the present disclosure may determine the invalid frames and the valid frames for the sensed images to improve the accuracy of recognition, and may calculate the number of danger marks of sub-image regions for a plurality of frames of valid sensed images over a period of time through a queue to improve the reliability of recognition. Therefore, the image recognition system and the image recognition method according to the present disclosure may effectively and automatically recognize whether the proportion of the drivable area in the current driving environment is excessively low, and may automatically generate a danger warning.

The above descriptions are only preferred embodiments of the present disclosure, but they are not intended to limit the scope of the present disclosure. Without departing from the spirit and scope of the present disclosure, one in the art can make further modifications and changes on this basis. Therefore, the protection scope of the present disclosure shall be subject to the scope defined by the claims.

What is claimed is:

1. An image recognition system, comprising:
   an image sensor, acquiring a plurality of sensed images of continuous frames; and
   an image processor electrically coupled to the image sensor, performing image recognition on the plurality of sensed images,
   wherein the image processor determines on the plurality of sensed images respectively whether a sensed image of the plurality of sensed images is a valid frame not containing a road, to determine a plurality of valid sensed images, and the image processor determines on the plurality of valid sensed images respectively whether a proportion of an area of a drivable area in a plurality of sub-image regions of the valid sensed image is less than a preset proportion, to perform danger marking, and
   wherein the image processor calculates a number of danger marks of the plurality of sub-image regions for each of the plurality of valid sensed images, and in response to the number of the danger marks corresponding to a same sub-image region being greater than a preset threshold, the image processor generates a danger warning.

2. The image recognition system according to claim 1, wherein in response to the image processor determining the plurality of sensed images as valid frames containing the road, the image processor does not determine the proportion of the area of the drivable area and does not calculate the number of the danger marks.

3. The image recognition system according to claim 1, further comprising:
   a storage device electrically coupled to the image processor, storing a determination model and a deep learning model,
   wherein the image processor inputs the plurality of sensed images into the determination model, such that the determination model determines whether the plurality of sensed images are valid frames not containing the road, to determine the plurality of valid sensed images, and the image processor inputs the plurality of valid sensed images into the deep learning model, such that the deep learning model classifies and labels the plurality of valid sensed images respectively, and the image processor determines on the plurality of valid sensed images respectively the proportion of the area of the drivable area in the plurality of sub-image regions of the valid sensed image.

4. The image recognition system according to claim 3, wherein the deep learning model labels at least one of the drivable area, an undrivable area, a background area, or an obstacle area in each of the plurality of valid sensed images.

5. The image recognition system according to claim 3, wherein the deep learning model divides each of the plurality of valid sensed images into the plurality of sub-image regions along a horizontal direction.

6. The image recognition system according to claim 3, wherein in response to the number of the danger marks corresponding to the same sub-image region being greater than the preset threshold, the image processor displays the danger warning in a corresponding area of a display screen of the plurality of sensed images.

7. The image recognition system according to claim 3, wherein the deep learning model is pre-trained with a plurality of training data, wherein each of the plurality of training data comprises an original reference image and a labelled reference image.

8. The image recognition system according to claim 7, wherein the labelled reference image comprises at least one of a labelled drivable area, a labelled undrivable area, a labelled background area, or a labelled obstacle area.

9. The image recognition system according to claim 7, wherein the labelled reference image comprises at least one of a labelled drivable area, a labelled undrivable area, a labelled background area, a labelled obstacle area, or an unlabeled area.

10. The image recognition system according to claim 1, wherein the image processor sequentially accesses and analyzes the plurality of valid sensed images through a queue.

11. An image recognition method, comprising:

acquiring a plurality of sensed images of continuous frames by an image sensor;

determining on the plurality of sensed images respectively, by an image processor, whether a sensed image of the plurality of sensed images is a valid frame not containing a road, to determine a plurality of valid sensed images;

determining on the plurality of valid sensed images respectively, by the image processor, whether a proportion of an area of a drivable area in a plurality of sub-image regions of the valid sensed image is less than a preset proportion, to perform danger marking;

calculating, by the image processor, a number of danger marks of the plurality of sub-image regions for each of the plurality of valid sensed images; and in response to the number of the danger marks corresponding to a same sub-image region being greater than a preset threshold, generating a danger warning by the image processor.

12. The image recognition method according to claim 11, wherein in response to the image processor determining the plurality of sensed images as valid frames containing the road, the determination on the proportion of the area of the drivable area and the calculation of the number of the danger marks are not performed.

13. The image recognition method according to claim 11, wherein the image processor inputs the plurality of sensed images into a determination model, such that the determination model determines whether the plurality of sensed images are valid frames not containing the road, to determine the plurality of valid sensed images, and the image processor inputs the plurality of valid sensed images into a deep learning model, such that the deep learning model classifies and labels the plurality of valid sensed images respectively, and the image processor determines on the plurality of valid sensed images respectively the proportion of the area of the drivable area in the plurality of sub-image regions of the valid sensed image.

14. The image recognition method according to claim 13, wherein the deep learning model labels at least one of the drivable area, an undrivable area, a background area, or an obstacle area in each of the plurality of valid sensed images.

15. The image recognition method according to claim 13, wherein the deep learning model divides each of the plurality of valid sensed images into the plurality of sub-image regions along a horizontal direction.

16. The image recognition method according to claim 13, wherein generating the danger warning comprises:

in response to the number of the danger marks corresponding to the same sub-image region being greater than the preset threshold, the image processor displaying the danger warning in a corresponding area of a display screen of the plurality of sensed images.

17. The image recognition method according to claim 13, wherein the deep learning model is pre-trained with a plurality of training data, wherein each of the plurality of training data comprises an original reference image and a labelled reference image.

18. The image recognition method according to claim 17, wherein the labelled reference image comprises at least one of a labelled drivable area, a labelled undrivable area, a labelled background area, or a labelled obstacle area.

19. The image recognition method according to claim 17, wherein the labelled reference image comprises at least one of a labelled drivable area, a labelled undrivable area, a labelled background area, a labelled obstacle area, or an unlabeled area.

20. The image recognition method according to claim 11, wherein the image processor sequentially accesses and analyzes the plurality of valid sensed images through a queue.

* * * * *